United States Patent [19]

Dennis

[11] 4,117,555
[45] Oct. 3, 1978

[54] CANINE TOILET

[76] Inventor: Bethel E. Dennis, 3115 E. Glenrosa, Phoenix, Ariz. 85016

[21] Appl. No.: 815,949

[22] Filed: Jul. 15, 1977

[51] Int. Cl.² ............................................. A47K 17/00
[52] U.S. Cl. ............................................... 4/1; 119/1
[58] Field of Search ............................. 4/1, 10; 119/1

[56] References Cited

U.S. PATENT DOCUMENTS

| | | | |
|---|---|---|---|
| 2,390,854 | 12/1945 | Thompson | 119/1 |
| 2,464,580 | 3/1949 | Johnson | 119/1 |
| 3,227,138 | 1/1966 | Campbell | 119/1 |
| 3,747,563 | 7/1973 | Brockhouse | 119/1 |
| 3,757,738 | 9/1973 | Hall | 119/1 |
| 3,811,410 | 5/1974 | Roberts | 119/1 |
| 3,817,213 | 6/1974 | Chalmars | 119/1 |
| 3,835,812 | 9/1974 | Edwards | 119/1 |

*Primary Examiner*—Henry K. Artis
*Attorney, Agent, or Firm*—Dean, Flickinger & Robertson

[57] ABSTRACT

A canine toilet which accommodates dogs of both sexes and has a flushing system which is automatically put into operation when a dog sits on a platform to defecate. It also includes such auxiliary features as a drinking fountain for the dog, a shampoo spray tube, a so-called "piddle post" for male dogs, a pedestal which functions as a toilet seat, having a slot for defecation, and perforations which function as weep holes, an adjustable ramp for use by dogs in getting onto the pedestal, and a storage area for the shampoo apparatus and other materials.

10 Claims, 7 Drawing Figures

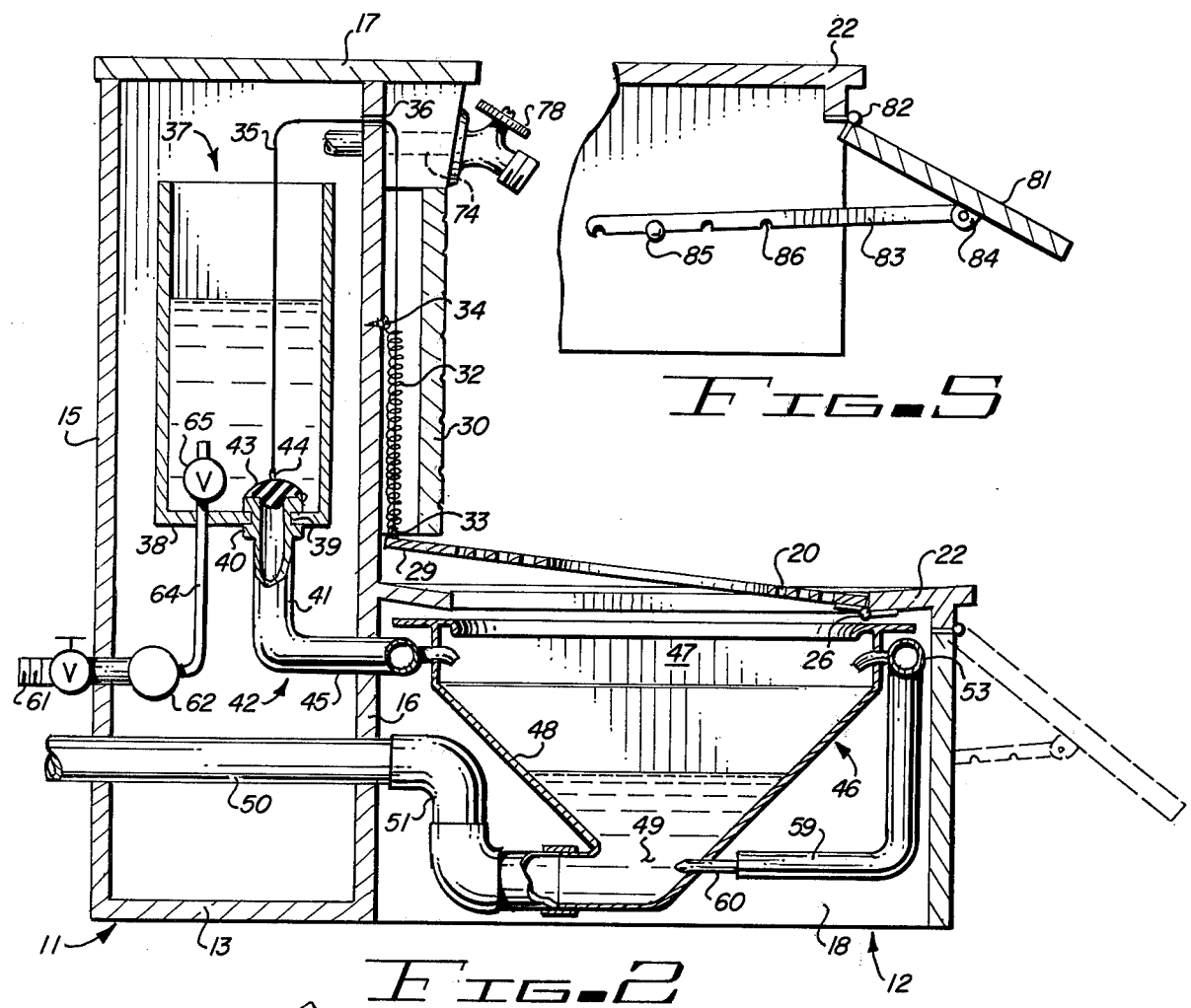

CANINE TOILET

BACKGROUND OF THE INVENTION

At the present time, it is well-recognized that provision must be made for accommodating dogs to literally "go to the toilet". This is true not only in larger cities, but smaller ones as well, where laws make it mandatory for the owner of the dog in taking him for a walk to pick up defecated matter in a bag and dispose of it. Moreover, the burden of taking the dog for a walk must be borne by all dog owners, as required by leash laws which prohibit letting the dog take care of himself.

The desirability of providing a flushable toilet for dogs has been recognized during recent years and has received the attention of several inventors working in this field.

One example of such a device comprises an animal toilet that is installed either indoors or outdoors by conventional plumbing, and includes a toilet bowl having a substantially flat bottom on which a dog stands while relieving itself and is arranged to clean animal excrement from the toilet, while simultaneously flushing and wiping the bowl to move the excrement into a discharged outlet. The operation of the toilet is controlled either manually or by electric power, not by the weight of a dog while standing in position to relieve himself.

Another example of a flushable toilet for dogs is characterized by the fact that when the dog's weight is on a treadle or pedestal, a valve is pre-conditioned to be opened when the dog leaves the treadle. The flushing does not occur while the dog is in a defecating position on the treadle.

In another known flushing device, the dog enters a cabinet through an opening that is normally covered by a pendulously swinging door. This door is connected by gearing to a valve in a flush tank comparable to a water closet; the dog defecates on the bottom of the cabinet and, when the aforesaid valve opens, water flows through a tube into the defecated mater, causing the latter to flow into a drain.

There are two types of flush tanks. One is the conventional water closet and the other is a conduit providing water under pressure. The water closet type is suitable for outdoor use and in homes or apartments at low altitudes, but is not particularly adapted for use in high-rise apartments. The prior art is singularly lacking in an animal toilet which may be readily adapted to either type of flushing operation.

Nearly all male dogs urinate while standing on three legs and while standing against a tree, fire plug or similar object. None of the now known canine toilets include an upright tube which, for the purpose of this specification, is called a "piddle post", for the accommodation of male dogs in urinating and which disposes of the urine.

Also, while it is known to provide an animal toilet including a ramp to assist dogs to get onto the pedestal or stand while defecating, such known ramps are of fixed angularity and are not susceptible of adjustment to a dog of a particular size.

Known canine toilets are also lacking in certain auxiliary features, such as a drinking fountain for the dog, a shampooing apparatus, a piddle post, which also functions as a guard for certain of the control mechanisms, a pedestal constituting the toilet seat which is formed with a slot through which defecated matter passes, and weep perforations. There is also no known dog toilet which includes a storage space for the shampoo apparatus or other articles associated with a dog.

OBJECTS OF THE INVENTION

With the foregoing conditions in mind, the present invention has in view the following objectives:

1. To provide a canine toilet which accommodates dogs of both sexes and which includes flushing apparatus which is automatically put into operation by a dog placing himself on a pedestal in position to defecate and which continues to flush as long as the dog is on the pedestal, and automatically stops when the dog leaves the pedestal.

2. To provide, in a canine toilet of the type noted, a toilet including a cabinet-like structure presenting a forwardly projecting portion having an open front end and an open top covered by a flange that slopes inwardly and downwardly and defines an opening. The flange is rectangular in shape and a pedestal is hingedly connected to the free edge of the front flange. This pedestal is formed with a slot, through which defecated matter passes, and a plurality of weep holes.

3. To provide, in a canine toilet of the type noted, a flush valve which normally closes the upper end of a flush tube and to which a line is connected. This line extends upwardly through a wall in the cabinet and down to a point where it is connected to the rear or inner end of the pedestal. A spring has its upper end connected to a wall of the cabinet and its lower end to the pedestal. This spring normally biases the rear end of the toilet seat pedestal into an upraised position. With a dog resting on the pedestal, the spring is extended and the line is pulled to open the flush valve and permit water to flow therefrom into a flushing system.

4. To provide, in a canine toilet of the kind described, a flushing system, including a rectangular tube that is connected to the flush tube aforesaid and which has four spray nozzles for directing water with a swirling motion into a flush tank that is mounted below the toilet seat pedestal. It also includes a downwardly extending "L"-shaped tube directed to the bottom of the flush tank which has an opening connected to a drain pipe.

5. To provide, in a canine toilet of the character noted, a conduit connected to a supply of water under pressure which is connected to a manifold. Connected to the manifold centrally thereof is the flush valve. A shampoo connection is provided at one end of the manifold and a connection for the drinking fountain is provided at the other end.

6. To provide, in a canine toilet of the type noted, a conventional water closet tank including a float valve for controlling the level of the water therein.

7. To provide, in a canine toilet of the kind described, a ramp having its upper edge hingedly connected to the front flange, together with means for adjusting the angular relation of the ramp to the flange structure on the forwardly extending portion of the cabinet.

8. To provide, in a canine toilet of the character noted, a "piddle post" which is semi-cylindrical in shape and which covers the spring and line aforesaid.

Various other more detailed objects and advantages of the invention, such as arise in connection with the carrying out of the above ideas in a practical embodiment, will in part become apparent and in part be hereinafter stated as the description of the invention proceeds.

SUMMARY OF THE INVENTION

The foregoing and other objects are achieved by providing a cabinet which might be described as being generally "L"-shaped, in that it includes a rear upright portion and a forward extension of lesser height than the rear upright portion. The rear upright portion comprises a bottom, front, rear and side walls and a removable lid. The forward extension includes side walls and a rectangular top comprising four inwardly and downwardly directed flanges, which, in turn, define an opening. A treadle, which functions as a toilet seat, is hingedly connected to the free edge of the front flange. This toilet seat has a central slot of substantial size through which defecated matter passes and is formed with a plurality of perforations which function as weep holes and accommodate urine from a bitch.

Positioned below the toilet seat pedestal is a flush tank having downwardly extending inclined sides terminating in a bottom opening. A drain pipe is connected to this opening.

Mounted in the rear upright portion of the cabinet is a water tank which may be secured in position in any preferred manner, such as by being connected to one or both of the side walls. Connected to an opening in the bottom wall of this water tank is a flush tube of "L" shape, the lower arm of which passes through an opening in the front wall of the rear upright portion and discharges into a flushing system. This system includes a continuous tube of rectangular shape disposed about the upper portion of the flush tank and has four angularly disposed nozzles for introducing water with a swirling motion into the flush tank. The flushing system also includes an "L"-shaped tube, the upper end of which is connected to one of the tubes about the upper portion of the flush and its lower end discharges into the bottom of the flush tank at the bottom opening therein.

The upper end of the flush tube is normally closed by a valve. A line extends from this valve up through the water tank, through an opening in the front wall of the rear upright cabinet portion and downwardly, where its lower end is connected to the rear edge of the toilet seat pedestal. An expansion coil spring has its lower end connected to the toilet seat treadle at a rear portion thereof, and its upper end to the front wall of the rear cabinet part. A guard for this line and spring is provided in the form of a semi-cylindrical member having a plurality of apertures therein and which constitutes a piddle post. It is evident that when a dog is resting on the toilet seat pedestal, the rear portion is depressed to exert a pull on the line against the action of the spring and pull the flush valve free of the upper end of the flush tube to cause water to flow from the water tank to the flushing system. The water swirls about in the flush tank and the defecated matter, with the water, is moved into the drain pipe connected to the bottom opening therein by the jet action of the "L"-shaped tubular member constituting a part of the flush system.

A conduit which is connected to an appropriate source of water under pressure extends through an opening in the rear wall of the rear cabinet portion and is connected to the mid portion of a manifold in the cabinet and extends in a direction parallel thereto. In one embodiment of the invention, a line extends from this manifold up into the water tank, and a float valve is associated therewith to maintain the water at a desired level. In another embodiment of the invention, an "L"-shaped tube extends from the manifold to a flush valve of the so-called pressure type. This flush valve is operated by the line aforesaid and is connected to the flushing system.

Connected to one end of the manifold is a tube having a spray nozzle at the other end and which is intended for shampoo purposes. A drinking fountain, which may be automatically operated by a dog, is connected to the other end of the manifold.

The front flange and side walls of the forward extension define an opening over which is positioned a ramp, the upper edge of which is hingedly connected to the outer edges of the front flange. The angular position of this ramp is rendered adjustable by a rod having its forward end pivotally connected to the ramp and formed with a series of notches, any one of which may be received by a pin extending inwardly from a side wall.

One side wall of the rear cabinet portion is formed with an opening that is normally closed by a hingedly mounted door and held in closed position by a spring catch. In the embodiment including this door, a horizontal partition is provided which affords storage space for the shampoo apparatus or other articles related to the grooming of a dog.

For a full and more complete understanding of the invention, reference may be had to the following description and accompanying drawings, wherein:

FIG. 2 is a longitudinal, vertical section, taken about the plane represented by the line 2—2 of FIG. 1;

FIG. 5 is a detail on an enlarged scale of the adjustable ramp;

FIG. 6 is a section through the rear portion of the cabinet of a modified embodiment, and FIG. 7 is a top plan of the manifold and associated parts of the modified embodiment.

DESCRIPTION OF THE PREFERRED EMBODIMENT

Figure 1:
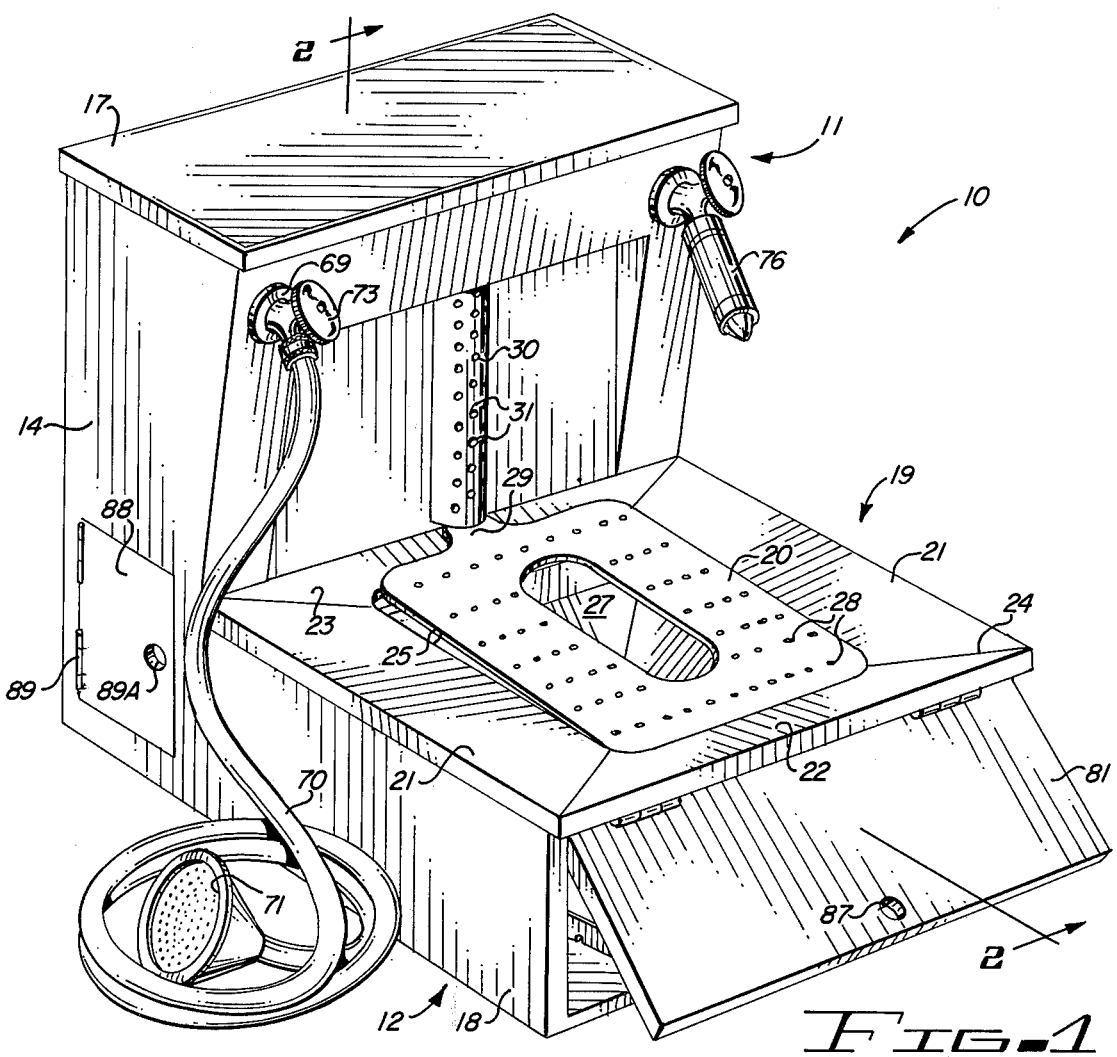
FIG. 1 is a perspective of the canine toilet of this invention.

Referring now to the drawings, wherein like reference characters denote corresponding elements throughout the several views, and first move particularly to FIGS. 1 and 2, the canine toilet of this invention is identified in its entirety by the reference character 10. It is of generally "L" shape, comprising a rear upright portion 11 and a forwardly extending lower portion designated generally 12.

Referring now more particularly to FIG. 2, rear upright portion 11 comprises a bottom 13, from which upstand side walls 14 (FIG. 1), rear wall 15 and front wall 16. Side walls 14 and front walls 15 and 16 define an open top which is ordinarily closed by lid 17, which is removable.

Forwardly extending portion 12 includes side walls 18, which may be formed integral with side walls 14. These side walls 18, together with front wall 16 of rear portion 11, define a top opening which is closed by a flange structure designated generally 19 and a toilet seat pedestal 20. Flange structure 19 comprises side flanges 21, a front flange 22 and a rear flange 23. Where the end edges of these flanges meet at mitered joints, one of which is designated 24, these flanges 20, 21, 22 and 23 are slanted inwardly and downwardly, with their lower edges defining a rectangularly shaped opening 25. The toilet seat pedestal 20 is hingedly mounted on the inner edge of front flange 22, as indicated at 26. It is formed with a central slot 27, through which defecated matter passes, and a plurality of perforations 28, which constitute weep holes, and possibly for the passage of urine from female dogs. Toilet seat pedestal 20 is formed with a tongue-like extension 29 which overlies rear flange 23.

Secured to the outer face of front wall 16 is a so-called "piddle post" 30 which is of semi-cylindrical construction and is formed with apertures 31 and is designed for use by male dogs in urinating.

Referring now again to FIG. 2, an expansion coil spring 32 has its lower end connected to tongue 29, as indicated at 33, and its upper end connected to the outer face of front wall 16, as indicated at 34. Spring 32 normally maintains toilet seat pedestal 20 in the canted or tilted position illustrated in FIGS. 1 and 2, that is, the position the pedestal assumes when the dog is not seated thereon. A line 35 has one end connected to tongue 29, extends upwardly in front of front wall 16, such as by passing through coil spring 32, through an opening 36 in front wall 16 and downardly into a water tank designated generally 37. Water tank 37 may be supported in the position illustrated in FIG. 2 in any preferred manner, such as by being secured to one or both of the side walls 14.

Water tank 37 includes a bottom 38 formed with an opening 39 which receives the flanged end 40 of the upper leg 41 of a flush tube designated generally 42. The flanged end 40 comprises two flanges which define a groove that receives the edge of opening 39. A flush valve 43 of the plug type normally closes the open end of flush tube 41, and the lower end of line 35 is connected thereto, as indicated at 44. Flush tube 41 also includes a lower horizontal leg 45 which passes through an opening in front wall 16.

Referring again more particularly to FIG. 2, a flush bowl is referred to in its entirely as 46. It comprises an upper square-shaped structure comprising four vertical walls 47 which define what might be called a square shape and present an opening beneath opening 25 defined by the flanged structure 19. Depending from each vertical wall 47 is an inclined wall 48, with the four inclined walls 48 converging toward a bottom opening 49. A drain pipe 50 is connected to this opening 49 by two "L"-shaped fittings 51.

Figure 3:
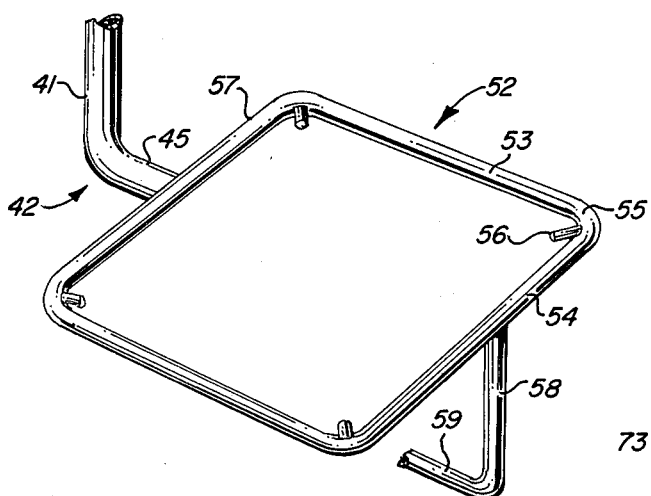
FIG. 3 is a detailed perspective of the tubular flushing system.

Referring now more particularly to FIG. 3, a flushing system is designated generally 52. It comprises four tubes 53 which define a rectangle and which includes a front tube 54. These tubes 53 extend along the outer sides of walls 47 and meet at corners 55. At each corner 55 is a jet nozzle 56 which is so directed as to cause water to emanate therefrom in a swirling motion. Flushing system 52 also includes a rear tube 57 to which leg 45 of flush tube 42 is connected. Depending from the mid portion of front tube 54 is the leg 58 of another "L"-shaped tube including a lower leg 59, from which extends a jet nozzle 60 which enters flush tank 46 at the opening 49.

Briefly summing up the operation of the parts so far described, with a dog seated on the pedestal 20, the rear portion thereof is depressed to exert a pull on line 35 which unseats valve 43 and causes water to flow from tank 37 through flush tube 42 into the flushing system 52 and enter flush bowl 46 with a swirling action to pick up defecated matter and discharge it through drain pipe 50.

Figure 4:
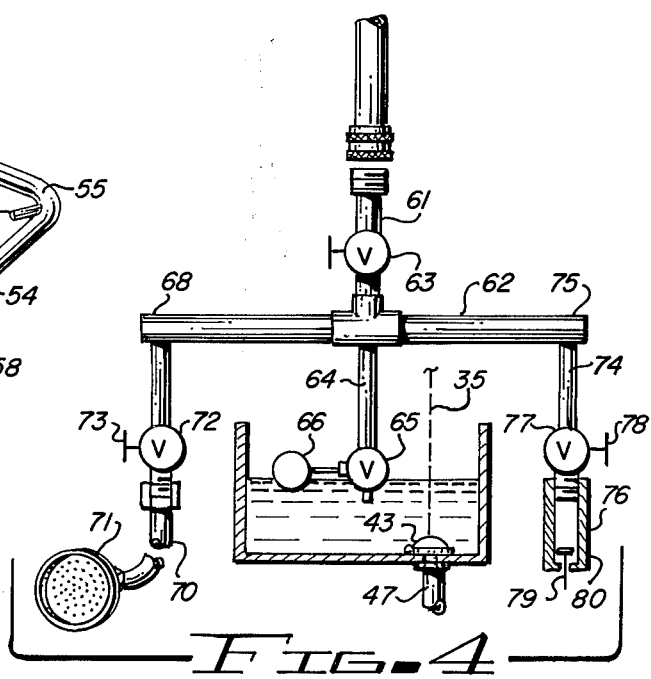
FIG. 4 is a top plan of the manifold and parts associated therewith.

Referring now more particularly to FIGS. 2 and 4, a water supply pipe 61 passes through an opening in rear wall 15 of cabinet part 11 and is connected to a manifold 62. A control valve 63 is included in pipe 61 on the exterior of cabinet 11 and is used to turn the water supply on or off. From manifold 62 a tube 64 extends through an opening in bottom wall 38 of water tank 37 and, adjacent its upper free end, is provided with a valve 65 which is controlled by a float 66 in a well-known manner.

Manifold 62 extends parallel to front and rear walls 15 and 18 of rear cabinet part 11 and is located adjacent to the upper edges thereof. A horizontal tube 67, which is parallel to a side wall 14, is connected to one end of manifold 62 at the point designated 68 by a vertical tube that is not illustrated. This tube 67 projects through an opening in front wall 16 and and its free end has a fitting 69 to which a flexible rubber hose 70 is connected. Rubber hose 70 has a spray head 71 at its free end and is intended for shampoo purposes. Tube 67 includes a valve 72 having an operating member 73 for controlling the operation of water for massage purposes. It will be understood that a vertical pipe, not herein illustrated, connects manifold 62 and tube 67 at point 68.

Another horizontal tube 74 is connected to the other end of manifold 62 at point 75 by a vertical pipe not illustrated. This tube 74 projects through an opening in front wall 16, and detachably connected to its free end is an automatic drinking fountain 76. A valve 77, which is controlled by an operating member 78, is detachably connected to the free end of tube 74. Thus, if a dog engages the lower end of pin 79 with his tongue, water will run through cylinder 80 and be available to the dog for drinking purposes.

Referring now to FIGS. 1 and 5, side walls 18 and front flange 22 define an opening which accommodates a ramp 81. Ramp 81 is hinged to the front edge of flange 22 as indicated at 82. An adjusting rod 83 has one end pivotally connected to the inner face of ramp 81 as indicated at 84, and extends into front extension 12 adjacent to a side wall 18. Extending inwardly from the side wall 18 is a pin 85, which is adapted to be received in any one of a series of notches 86 formed in rod 83. If desired, this rod 83 may be duplicated at the other side of the extension 12. It is evident that ramp 81 may be adjusted to a desired angle for accommodating a dog of a particular size, particularly smaller dogs, to assist them to get onto the toilet seat pedestal 20. Ramp 81 may be formed with an orifice 87 to facilitate adjustment thereof.

Referring again to FIG. 1, one of the side walls 14 is formed with an access opening adjacent to its lower edge which is normally closed by a door 88 that is hingedly mounted on the side wall, as indicated at 89. Door 88 will normally be held in closed position by a spring catch and may be opened by engaging an operating member 89A. From an inspection of FIG. 2, it is evident that there is a large amount of space below flush tube 27 and manifold 62 which may be used for storing shampoo tube 70 or other articles associated with the grooming of a dog. Door 88 provides access to this space for insertion or removal of articles therefrom.

A MODIFIED EMBODIMENT

Attention is now directed to FIGS. 6 and 7, wherein a modified embodiment is illustrated. This modification is characterized by the fact that the water tank 37 and certain of the associated parts are eliminated and replaced by a so-called pressure valve. Thus, as shown in these Figs., a conduit 90 is connected to a source of water under pressure and passes through an opening in rear wall 15 of cabinet part 11. The latter is formed with a horizontal partition 91. Below this partition 91 is located a cross fitting 92. Conduit 90 is connected to one leg of fitting 92 and, exteriorially of cabinet, part 11 is provided with a valve 93 which is controlled by an operating member 94. A manifold leg 95 is connected to fitting 92 and, adjacent its free end, indicated at 96, is connected by vertical pipe, not herein illustrated, to a horizontal pipe 97 which corresponds to the tube 67 of FIG. 4. This pipe 97 is connected to the massage apparatus in exactly the same manner as described above in connection with FIG. 4.

A manifold includes another leg 98 which, adjacent its free end at 99, is connected by a vertical tube not illustrated to a horizontal pipe 100 which corresponds to the pipe 74 of FIG. 4 and which is connected to the automatic drinking fountain.

Another leg 101 extends from fitting 92 and is connected to valve 102 which is opened or closed by an operating member 103 (FIG. 6) which is spring-biased to maintain the valve 102 closed. It is evident that fitting 92 and legs 95, 98 and 101 constitute a manifold. Line 35 passes through an opening 104 in partition 91 with its lower end being connected to operating member 103. When tension is applied to line 35 by a dog resting on the toilet seat pedestal 20, valve 102 is opened to cause water to flow therefrom through fitting 105, which is connected to flushing system 52.

While substantially all of the elements of both embodiments above described may be made from any of several materials, such as metal or plastic, an appropriate plastic, such as fiberglass, is indicated as a preferred material. Needless to say, the valves would probably be of metal.

While preferred specific embodiments of the invention are hereinbefore set forth, it is to be clearly understood that the invention is not to be limited to the exact constructions, mechanisms and devices illustrated and described, because various modifications of these details may be made in putting the invention into practice.

What is claimed is:

1. In a canine toilet, including a cabinet having a rear upright portion and a forwardly extending extension; a source of water in said upright portion and a hingedly mounted toilet seat pedestal in the forward extension, the improvement consisting of:
    (a) a defecating slot in said toilet seat pedestal;
    (b) a flush bowl immediately below said toilet seat pedestal;
    (c) a flushing system for said bowl connected to said water supply by a water system including a valve;
    (d) means for biasing said toilet seat pedestal in a canted position with the rear portion thereof upraised; and
    (e) means for connecting the rear portion of said toilet seat pedestal to said valve, whereby a dog seated on said toilet seat pedestal opens said valve to cause water to flow from said water supply through said flushing system, and removal of the dog from said toilet seat pedestal causes said valve to close, and flushing continues all of the time that the dog is seated on the pedestal.

2. The canine toilet of claim 1 in which the means for connecting the toilet seat pedestal to said valve constitutes a flexible line, and the means for biasing the toilet seat pedestal into a canted position constitutes a coil spring, together with a semi-cylindrical guard mounted on said cabinet and enclosing said line and spring.

3. The canine toilet of claim 1 in which said forward extension has four inwardly and downwardly inclined flanges at its upper edge which define an opening in which said toilet seat pedestal is mounted.

4. The canine toilet of claim 3 in which the flushing system includes a rectangularly-shaped tube surrounding the upper portion of said flush bowl and connected to said water supply, and a plurality of jet nozzles extending from said rectangularly shaped tube into said flush bowl.

5. The canine toilet of claim 4 in which said flush bowl terminates in a bottom opening, a drain pipe connected to said bottom opening and a tube extending from one side of said rectangularly shaped tube to a jet nozzle entering said flush bowl at the bottom opening therein.

6. The canine toilet of claim 5 in which the water supply includes a pipe which enters said rear upright portion of said cabinet and is connected to a horizontal manifold within said cabinet, together with shampoo apparatus including a flexible tube connected to one end of said manifold and an automatic drinking fountain connected to the other end of said manifold.

7. The canine toilet of claim 6, together with a water tank within said rear upright cabinet part, a pipe extending from said manifold through the bottom of said water tank and a float control valve included in said last mentioned pipe within said water tank.

8. The canine toilet of claim 1, together with a ramp which is hingedly mounted at its upper edge to the forward edge of said extension and means for adjusting the angular position of said ramp.

9. The canine toilet of claim 1, wherein the water supply comprises a pipe extending from a source of water under pressure into said upright rear cabinet part, a manifold connected to said pipe and a pressure valve connected to said manifold, and includes an operating member which is included in the connection between the water supply and the toilet seat pedestal.

10. The canine toilet of claim 9, together with a horizontal partition in the upright rear cabinet part and which cooperates with the walls of said cabinet part to define a storage space.

* * * * *